United States Patent
Lubinsky et al.

[11] Patent Number: 5,125,013
[45] Date of Patent: Jun. 23, 1992

[54] METHOD OF SCANNING OF TONED IMAGE IN A LIQUID GATE

[75] Inventors: Anthony R. Lubinsky, Webster; Robert W. Kulpinski; John W. May, both of Rochester, all of N.Y.

[73] Assignee: Eastman Kodak Company, Rochester, N.Y.

[21] Appl. No.: 742,783

[22] Filed: Aug. 8, 1991

[51] Int. Cl.$^5$ ............................................ G03G 13/044
[52] U.S. Cl. ........................................ 378/33; 378/28; 355/75
[58] Field of Search .................. 335/222, 233, 256; 118/659; 378/28, 29, 32, 33

[56] References Cited

U.S. PATENT DOCUMENTS

| | | | |
|---|---|---|---|
| 4,204,725 | 5/1980 | DiStefano et al. | 355/3 R |
| 4,436,054 | 3/1984 | Ceelen et al. | 118/652 |
| 4,524,395 | 6/1985 | Banton | 358/300 |
| 4,743,758 | 5/1988 | Chan et al. | 250/327.2 |
| 4,743,759 | 3/1988 | Boutet | 250/327.2 |
| 4,775,791 | 10/1988 | Owen et al. | 250/327.2 |
| 4,778,995 | 10/1988 | Kulpinski et al. | 250/327.2 |
| 4,811,327 | 3/1989 | Petrov et al. | 369/111 |
| 4,865,937 | 9/1989 | Santilli et al. | 430/137 |
| 4,991,918 | 12/1991 | Owen et al. | 350/96.1 |

Primary Examiner—Janice A. Howell
Assistant Examiner—Don Wong
Attorney, Agent, or Firm—William F. Noval

[57] ABSTRACT

An electrical image signal is generated by providing a toner image on a support, scanning the toner image through a liquid layer in contact with the toner image to produce an optical response and photoelectrically detecting the optical response to produce an electrical image signal.

18 Claims, 5 Drawing Sheets

METHOD OF SCANNING OF TONED IMAGE IN A LIQUID GATE

TECHNICAL FIELD

This invention relates in general to the scanning of a toner image and more particularly to the scanning through a liquid layer of an electrographic toner image on a support.

BACKGROUND OF THE INVENTION

In a typical liquid-developed electrophotographic imaging system (luminescent or conventional toner), as shown in FIG. 1, the imaging process includes the following steps.

First the electrostatic latent image is formed by uniformly charging a photoconductor (10), for example, a selenium plate, and then exposing (12) it to an imagewise pattern of radiation. The resulting voltage differential image is developed (14) with a liquid development electrode (as per U.S. Pat. No. 4,624,543) and then skived (15) (using either forced air or vacuum or both) to remove excess developer from the imaging plate. This toned image is then rinsed (16) and skived (17) with an inert hydrocarbon liquid, such as toner carrier liquid, to further remove excess developer. For applications in which the toner image is not transferred to another surface, the photoconductor imaging plate may then be blotted (18) to remove any excess drops from the edge of the plate by methods known to the art, and then dried (20).

In a preferred mode using luminescent toner, disclosed in commonly assigned U.S. Patent application Ser. No. 280,793, inventors Lubinsky and May, filed Dec. 7, 1988, the toned image is then scanned (22) with a beam of stimulating light generated by a laser. The laser beam is deflected by a galvanometer or polygon while the image plate is translated to effect a raster scan of the luminescent image. Light emitted from the image is collected and detected by a light collector of the type comprising a mirror box to collect the emitted light and direct it to a photomultiplier (PMT) or photodiode. A filter over the face of the detector blocks exciting radiation and passes emitted radiation. Examples of such a light collector/detector useful with this method are shown in U.S. Pat. No. 4,743,758 [Chan et al.] and U.S. Pat. No. 4,743,759 [Boutet].

The last cleaning step (24) in the process is to thoroughly remove all the toner from the imaging plate so that it can be reused. This last step is difficult since the electrostatic and VanderWaals type adhesive forces that hold the toner particles (diameter typically 0.4–1 μm) to the surface require an aggressive cleaning procedure (e.g. mechanical squeegee, brush, skive, etc.) without generating scratches or digs on the surface of the imaging plate. When the toned image is dried, the difficulty in cleaning the plate is particularly enhanced because the drying process causes self-fixing of the toner image and increases the above adhesive forces. This last step ultimately determines the useful life of the photoconductor imaging plate.

Commonly assigned U.S. Patent Application Ser. No. 280,793, inventors Lubinsky and May, filed Dec. 7, 1988, discloses an electrographic process including the steps of forming a differential voltage pattern, developing the voltage pattern with luminescent toner, exciting the developed image to emit radiation, and photoelectrically detecting the emitted radiation to produce an electrical image signal.

U.S. Pat. No. 4,524,395, issued Jun. 18, 1985, inventor M. E. Banton discloses a multi-mode reproduction apparatus in which an image to be read is processed xerographically with dry toner to provide a developed image on a photoconductive member which is raster scanned with a high intensity beam. Light reflected from the photoconductive member is captured in an elongated rod-like collector and photoelectrically detected to produce an electrical image.

U.S. Pat. No. 4,204,725, issued May 27, 1980, inventors T. H. DiStefano et al., discloses a printer/copier having a sensing electrode which detects a charge change on a photoconductor surface as it is scanned with a laser beam.

U.S. Pat. No. 4,436,054, issued Mar. 13, 1984, inventors T. M. Ceelen et al., discloses a cleaning station for removing residual toner from a photoconductor. The cleaning station includes toner rolls for supplying cleaning liquid to flush toner particles from foam cleaning rolls.

U.S. Pat. No. 4,811,327, issued Mar. 7, 1989, inventors V. V. Petrov et al., discloses an optical storage device including a cylindrical information carrier disposed in a cylindrical container filled with transparent liquid or gaseous medium. The optical medium is scanned with a laser and read out by means of a photoelectric detector.

Commonly assigned U.S. Pat. No. 4,778,995, issued Oct. 18, 1988, inventors R. W. Kulpinski et al., discloses apparatus for reading out an image stored in a transparent stimulable phosphor sheet including means for maintaining a layer of optical index matching fluid between a light detector and the transparent stimulable phosphor sheet, to provide optical contact between the light detector and the transparent stimulable phosphor. Means are provided for scanning a beam of stimulating light in a line across the phosphor sheet and for relatively moving the phosphor sheet and light detector in a direction perpendicular to a scan line.

None of these patents discloses the photoelectric detection of a liquid-toned image through a liquid layer.

SUMMARY OF THE INVENTION

According to the present invention, there is provided an electrographic technique in which a toned image, preferably a liquid-toned image, is scanned through a liquid layer. The inventive technique is advantageous over known electrographic techniques for the following reasons, among others.

1. Greatly increases the ease of cleaning the support, e.g. the photoconductor surface.
2. Improves the useful lifetime of the support, e.g. the photoconductor, by reducing the number of surface defects introduced during the cleaning process.
3. Reduces the number of processing steps required in prior art liquid toner development electrographic process by eliminating the skiving, blotting and drying steps. The access time, cost, reliability and convenience of the process are consequently improved.
4. Allows the use of a low vapor pressure, slow-drying toner carrier liquid, which minimizes venting of undesirable vapors. This liquid has a high flash point for improved safety and reduced manufacturing costs.

According to a feature of the present invention, there is provided a method of generating an electrical image signal comprising the steps of, providing a toner image on a support, scanning the toner image through a liquid layer in contact with the toner image to produce an optical image and photoelectrically detecting the optical image to produce an electrical image signal.

According to an aspect of the present invention, a liquid-developed luminescent toner image is scanned through a liquid layer to excite the luminescent toner to emit a radiation image which is photoelectrically detected to produce an electrical image signal.

According to another aspect of the present invention, a liquid-toned image, which is scanned through a liquid layer, is formed by exposing a photoconductor to an x-ray image to produce a differential voltage pattern on the photoconductor corresponding to the x-ray image and developing the differential voltage pattern with liquid toner.

According to a further aspect of the present invention, the liquid scanning layer preferably may be a low vapor pressure liquid to eliminate venting of undesirable vapors, and having a high flash point preferably higher than 140° F. for improved safety and reduced manufacturing cost.

DESCRIPTION OF THE PREFERRED EMBODIMENTS

Figure 1:
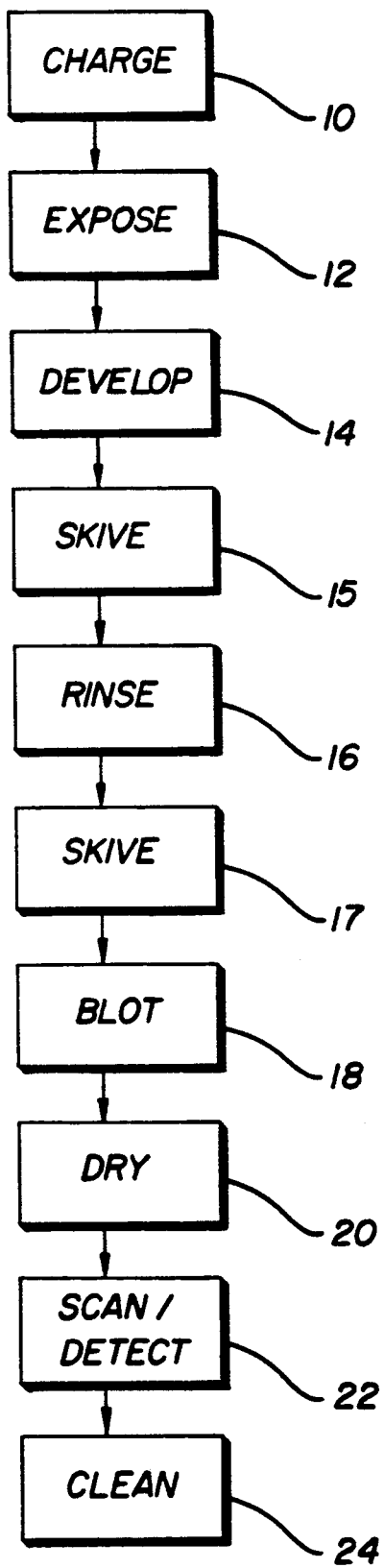
FIG. 1 is a block diagram of a prior art electrographic method.
Figure 2:
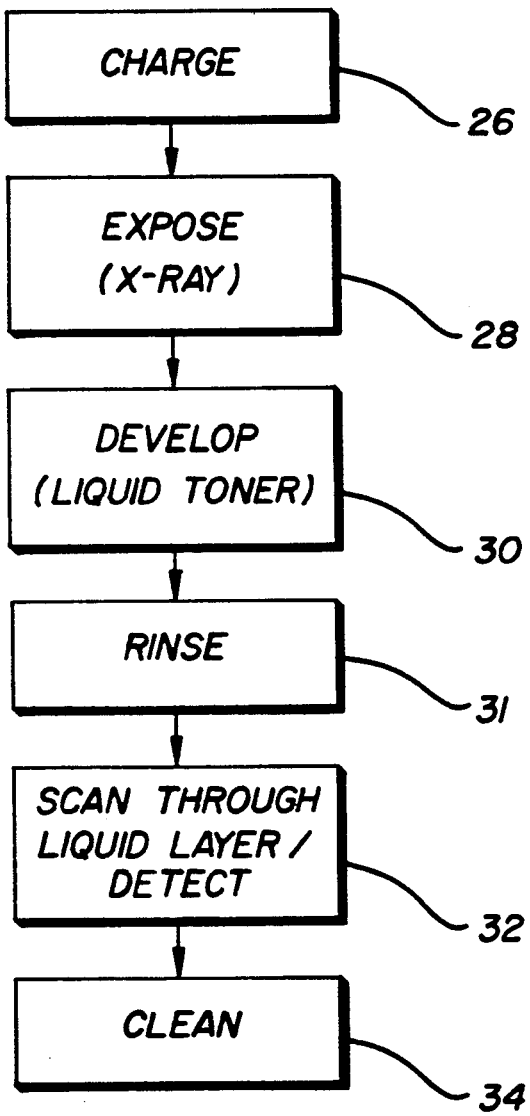
FIG. 2 is a block diagram of an embodiment of the technique of the present invention.

Referring now to the figures, there will be described preferred embodiments of the present invention. In general, the present invention provides a technique for generating an electrical image signal, which includes the steps of providing a toner image on a support, scanning the toner image through a liquid layer in contact with the toner image to produce an optical response and photoelectrically detecting the optical response to produce an electrical image signal. Referring to FIG. 2, there is shown a block diagram of an embodiment of the present invention. As shown, a photoconductor is charged (26) with a uniform electrostatic charge (voltage potential).

The uniformly charged photoconductor is exposed (28) to a radiation image to produce an electrostatic image (differential voltage pattern) which corresponds to the radiation image. The radiation image may be an x-ray image formed by passing x-rays through an object (such as the body part of a patient).

The electrostatic image is developed (30) with liquid toner of the type as described, for example, in U.S. Pat. No. 4,865,937 to Santilli and May, or as described in commonly assigned, copending U.S. application No. 07/742,139, entitled "An Electrographic Liquid Developer and Method of Making Same", by Santilli and May, to produce a liquid-toned image. The still-wet developed image may then be rinsed (31) with, e.g., an inert hydrocarbon liquid, like the toner carrier liquid, to remove excess developer. Preferably, the rinsing liquid is a low vapor pressure liquid (such as ISOPAR L or M) which minimizes the need for venting undesirable vapors during rinsing, and which has a high flash point for safety. The still-wet liquid toned image is then scanned (32) through a liquid layer to produce an optical response, which is photodetected to produce a corresponding electrical image signal.

The photoconductor is then cleaned (34) to remove the liquid-toned image. By keeping the toner image wet throughout the development and scanning processes, ease of cleaning of the photoconductor is greatly increased and the useful life of the photoconductor is improved.

Figure 3:
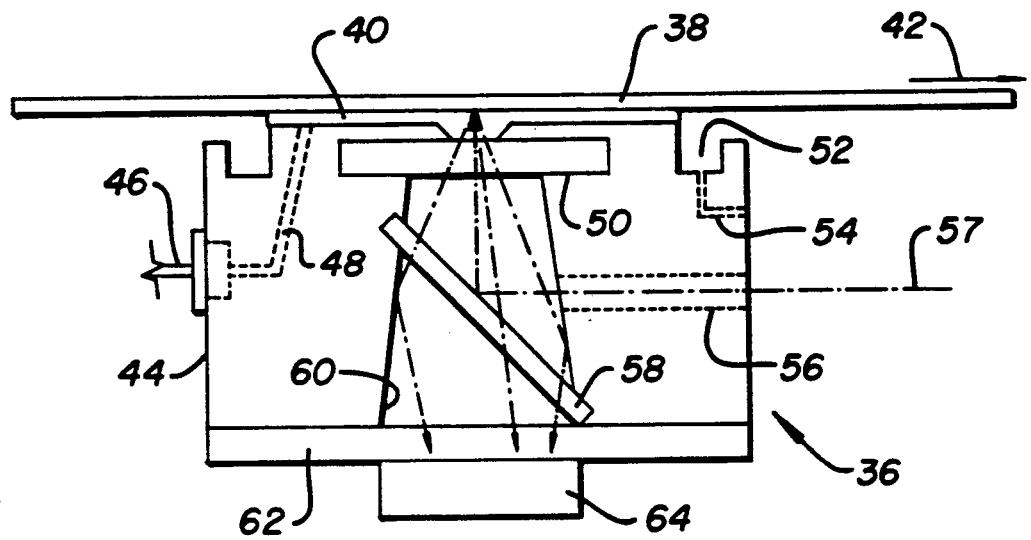
FIG. 3 is an elevational view of an embodiment of the present invention.

In FIG. 3, there is shown liquid gate collector 36 which allows scanning of a liquid-toned image on photoconductor 38 through a liquid layer 40. Photoconductor 38 is translated past liquid gate collector 36 in the direction of arrow 42 by well-known translation mechanisms (such as a screw driven platform). Collector 36 includes a head 44 spaced from photoconductor 38. Head 44 includes an inlet 46 for layer 40 of liquid 48 between photoconductor 38 and head 44. Liquid 48 is flowed over glass plate 50 which forms a liquid gate. The liquid is flowed in a laminar flow and at flow rates required to maintain the liquid layer 40 plus account for any carryout loss by the photoconductor. The liquid flows into trough 52 and out outlet 54 where it is recirculated to inlet 46 by a pump (not shown). A filter (not shown) may be included in the flow path to keep the circulating liquid clean and free of dust or particulates. The minimum flow condition of liquid 48 prevents turbulence in the flow near the scan line which could cause light scattering and a reduction in image quality. The forces acting on the toner due to the flow of liquid in the liquid gate are small compared to the toner adhesive forces, and therefore the liquid layer does not wash the toner away so that the toner image can be scanned again if desired.

Liquid 48 may be the same liquid used as a carrier for the liquid toner. Also, liquid 48 may be the same liquid used to rinse the plate, before scanning it. Preferably, liquid 48 is a low vapor pressure liquid (such as ISOPAR L or M) which minimizes the need for venting undesirable vapors during scanning, and which has a high flash point for safety.

Collector 36 includes a slot 56 in head 44 through which a scanning beam 57 of light (such as laser light) passes to a dichroic beam splitter 58. Splitter 58 is positioned below plate 50 at a 45° angle in opening 60 of head 44. Scanning beam 57 is reflected by splitter 58 through plate 50 and liquid layer 40 to scan the liquid toner image on photoconductor 38 as it is translated in the direction of arrow 42. Beam 57 is deflected (by a rotating polygon mirror or galvanometer mirror) in a scan line across photoconductor 38 as it is translated to effect a raster scan of the toner image.

If the toner image is a luminescent toner image, the stimulated emission passes through plate 50, beam splitter 58 and filter 62 to photodetector 64. Filter 62 only passes the emitted light and not scattered stimulating light of beam 57. Photodetector 64 includes an array of photomultiplier tubes or photodiodes.

Photodetector 64 produces an electrical image signal which may be (1) stored in a storage device (such as magnetic or optical disc devices); (2) visually reproduced on a display monitor or as hard copy, e.g. a film image by, for example, a laser or CRT printer; or (3) transmitted to a remote location for storage, display or reproduction.

Figure 4:
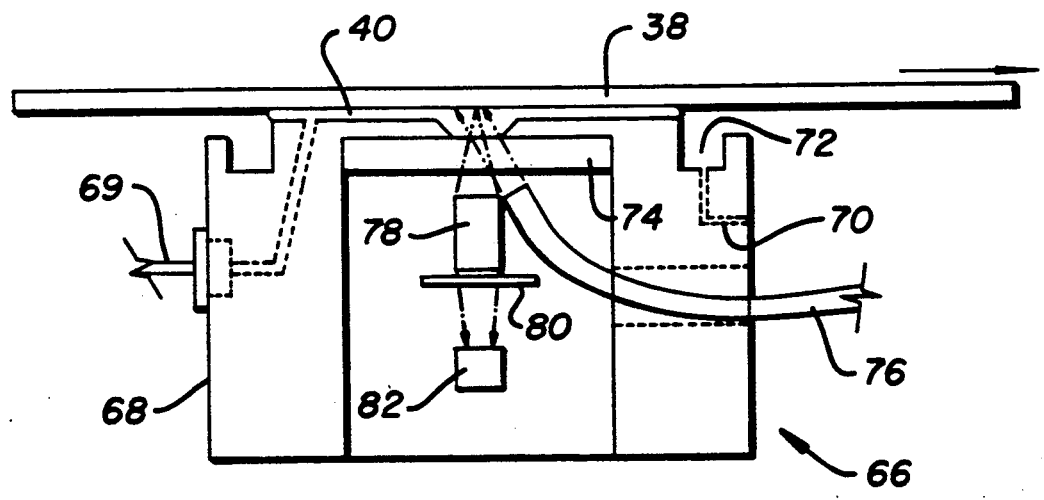
FIG. 4 is an elevational view of another embodiment of the present invention.

Referring to FIG. 4, there is shown another technique for scanning the liquid-toned image formed on photoconductor 38. As shown, photoconductor 38 is translated past liquid gate collector 66. Collector 66 includes a head 68 having liquid troughs 72. Liquid layer 40 is formed between photoconductor 38 and glass plate 74 on head 68. Photoconductor 38 is scanned by line illumination from a linear fiber optic bundle 76. The emitted image passes through glass plate 74, a linear selfoc lens array 78, filter 80 and is detected by a linear photosensor 82 (such as a linear charge coupled device or CCD array).

Figure 5:
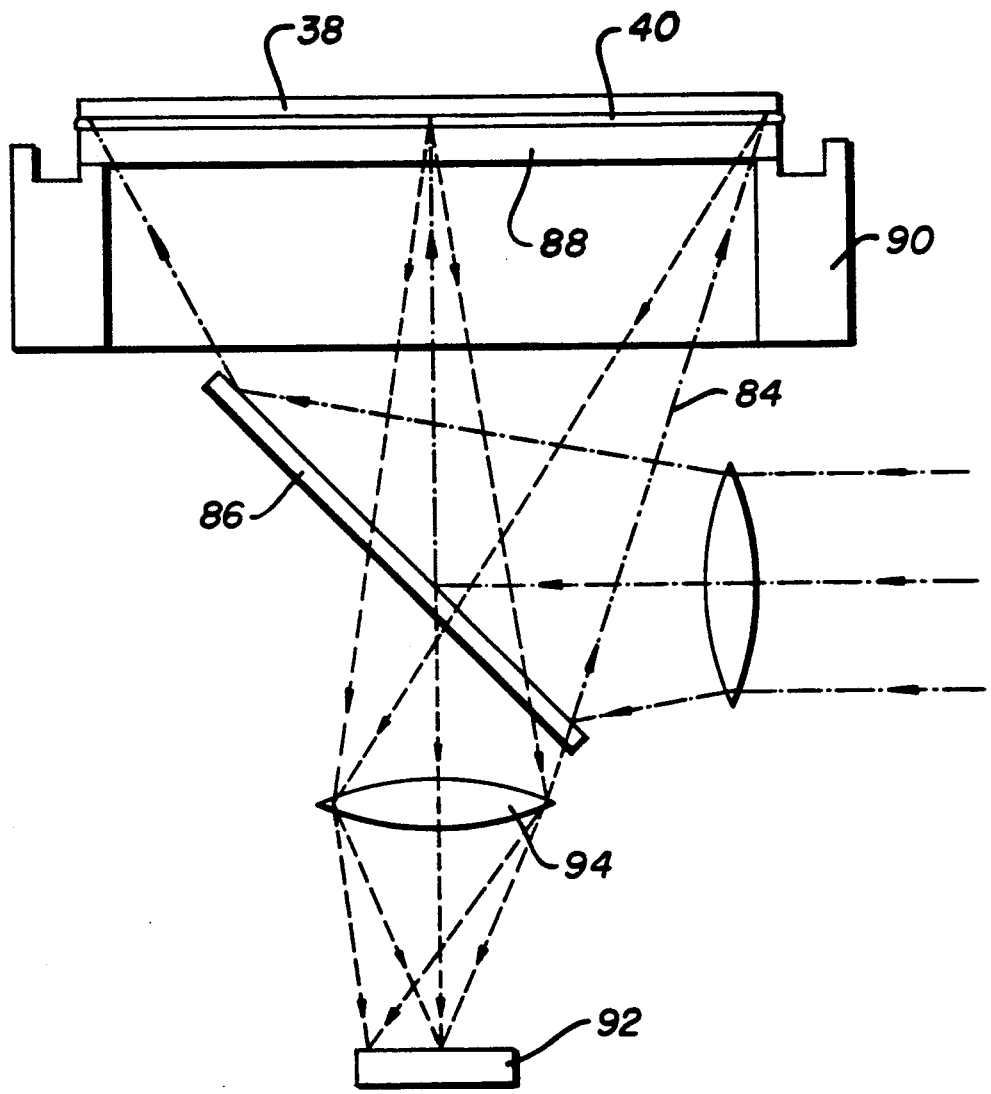
FIG. 5 is a schematic, elevational view of yet another embodiment of the present invention.

FIG. 5 shows another scanning technique useful in the present invention. As shown, the toner image on photoconductor 38 is illuminated through liquid layer 40 by means of an area illuminating beam 84 which is reflected from dichroic mirror 86 through glass plate 88 mounted on head 90. The emitted optical image passes through dichroic mirror 86 and is projected onto area detector array 92 (such as an area CCD array) by lens 94.

Figure 6:
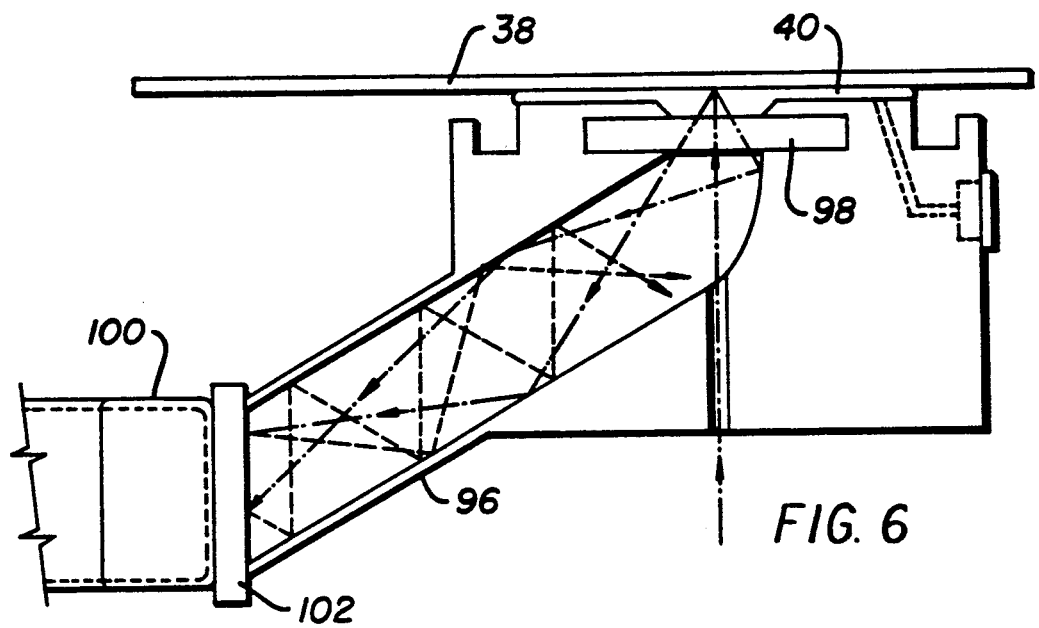
FIG. 6 is a schematic, elevational view of a light collector useful in the present invention.
Figure 7:
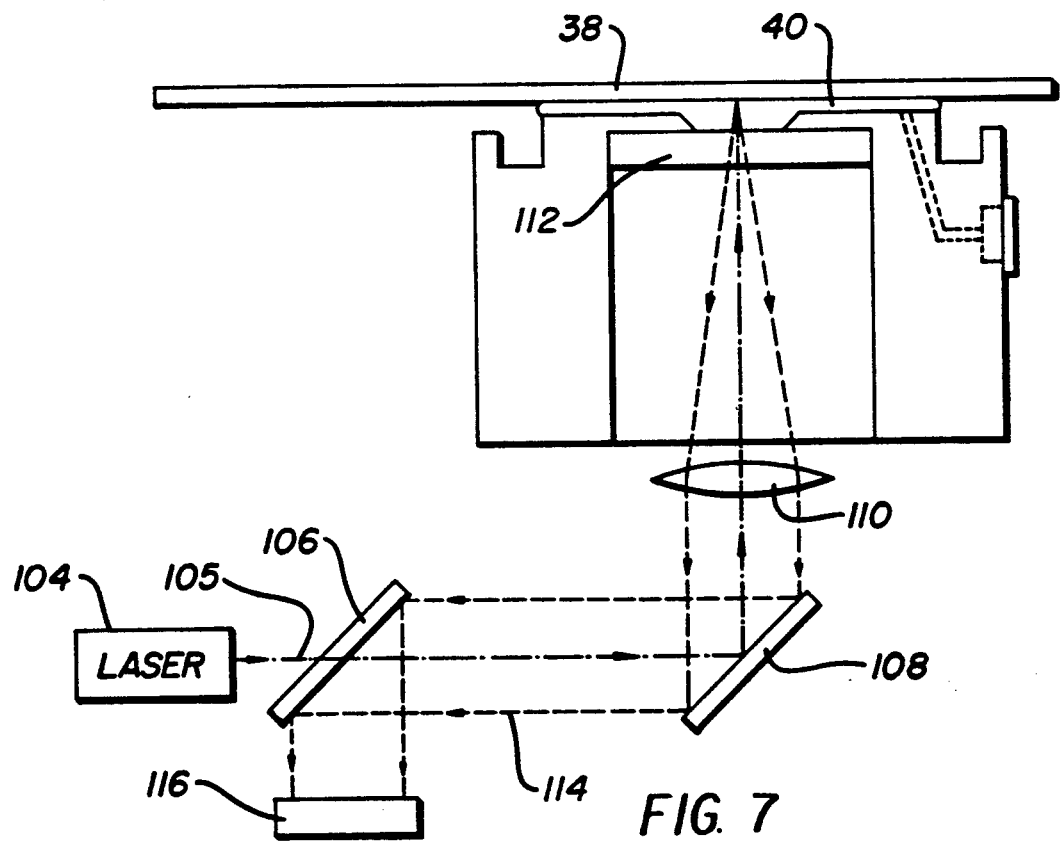
FIG. 7 is a schematic elevational view of another scanning technique useful in the present invention.

FIG. 6 shows the use of a diffuse light collector to acquire the optical image emitted or reflected by a toner image scanned through a liquid layer. As shown, a diffuse light collector 96 (of the type disclosed in commonly assigned U.S. Pat. No. 4,743,758) is coupled at one end to plano-plano optical element 98 and the other end to PMT 100 through filter 102. Other possible light collectors are described in U.S. Pat. Nos. 4,743,758; 4,743,759; 4,775,791; and 4,991,918.

Optical element 98 of FIG. 6 may be replaced with a plano-concave (convex) element. The use of such an element near the image plane is known to facilitate Petzval curvature correction. Therefore, by allowing this element to have optical power, another degree of freedom is added to the optical design of the laser scanning system.

A retroreflection scanning system is shown in FIG. 8. As shown, a laser 104 produces a scanning laser beam 105 transmitted through dichroic mirror 106, reflected from mirror 108, transmitted through lens 110, plate 112 and liquid layer 40 onto a liquid-toned image formed on photoconductor 38. The light image 114 emitted by or reflected from the toner image, is transmitted through plate 112, lens 110, reflected from mirrors 108 and 106 and converted to an electrical image signal by photoelectric detector 116.

EXAMPLE

A Se plate, 150 $\mu$m thick, obtained from Noranda Research Center, Quebec, Canada was charged and exposed to 30 kVp x-rays through a "Kodak-Pathe" radiographic test phantom as described in detail in U.S. Patent application Ser. No. 280,793, filed Dec. 7, 1988, entitled "Electrographic Process for Generating Electrical Image Signal", by Lubinsky and May. The resulting electrostatic latent image was developed with a liquid developer having toner particles containing a Rhodamine dye, as described in U.S. Pat. No. 4,865,937 to Santilli and May. The toner image was dried, and then scanned using an argon ion laser source at 488 nm, a rotating polygon beam deflector, a reflective light collector as described in U.S. Pat. No. 4,743,759 to J. Boutet, and two Hammamatsu Type R1512 photomultiplier tubes with Schott OG-530 colored glass filters. The image was sampled with a pixel size of 50 $\mu$m at a raster pitch of 50 $\mu$m, and the $1/e^2$ diameter of the scanning beam at the sample plane was about 75 $\mu$m. The digital image data thus collected were tone scale processed and printed on blue-tinted silver halide film using a KODAK KELP Laser Printer sold by the Eastman Kodak Company, Rochester, N.Y.

For comparison, the same toned image was rewetted with ISOPAR G, and scanned through a liquid gate using the technique of FIGS. 2 and 3. The image was again sampled with a pixel size of 50 $\mu$m, at a raster pitch of 50 $\mu$m, and the beam diameter again was 75 $\mu$m using an argon ion laser at 488 nm. The image data thus collected were processed and printed on the same silver halide film, using a KODAK KELP Laser Printer.

Direct comparison of the output film images after scanning the electrophotographic image through a liquid gate, and after scanning the same electrophotographic image by the previous method revealed that the liquid-scanned output film image was extremely clear and sharp, and faithfully reproduced all of the image features that could be seen in the s comparison output film image. There were no visible swirls, flow patterns, bubbles, or other artifacts which might be associated with a liquid motion. There were no visible Newton's rings or other interference artifacts.

It has been found by experience to be much easier to clean the toned plates while still wet after rinsing, or after scanning in a liquid gate, than when the plates are allowed to dry. If the toned image is allowed to dry, it must first be rewet, and soaked for some time with toner carrier liquid (e.g., ISOPAR G or M), and then "scrubbed" several times with a cloth or brush to satisfactorily remove residual toner; while a still-wet toned plate may more easily be wiped with cloth or squeegee to remove residual toner, in a shorter time.

Preferably, the liquid layer used in the liquid gate is a lower vapor pressure liquid, such as ISOPAR M, which minimizes the need for venting of undesirable vapors during scanning. This liquid has a high flash point for improved safety and reduced manufacturing costs.

Industrial Applications and Advantages

The present invention is useful in electrographic processes and equipment and, in particular, in electrophotographic processes using x-ray exposure. The invention has several advantages. The ease of cleaning of the electrographic imaging member is greatly increased. There is improvement in the useful lifetime of a photoconductor used in the present method by a reduction in the number of defects introduced during the cleaning process. The number of processing steps is reduced by elimination of the skiving, blotting and drying steps before scanning. The access time, cost, reliability, and convenience of the process are consequently improved and throughput increased.

What is claimed is:

1. A method of generating an electrical image signal comprising the steps of
   providing a toner image on a support;
   scanning the toner image through a liquid layer in contact with said toner image to produce an optical response; and photoelectrically detecting the optical response to produce an electrical image signal.

2. The method of claim 1 wherein said providing step includes the steps of forming a differential voltage pattern on said support and developing the voltage pattern with liquid toner to form a liquid-toned image.

3. The method of claim 2 in which said liquid-toned image is rinsed to remove excess developer.

4. The method of claim 2 wherein said developing step includes developing said voltage pattern with a luminescent liquid toner, wherein said scanning step includes exciting said luminescent toner to emit a radiation image and said detecting step includes detecting the emitted radiation image to produce an electrical image signal.

5. The method of claim 1 wherein said so providing step includes the steps of exposing a photoconductor to an x-ray image to produce a differential voltage pattern on the photoconductor corresponding to said x-ray image and developing the differential voltage pattern with liquid toner to produce a corresponding liquid-toned image.

6. The method of claim 5 wherein said developing step includes developing said differential voltage pattern with liquid developer containing luminescent toner to produce an unfixed liquid-developed luminescent toner image; wherein said scanning step includes exciting said luminescent toner to emit a radiation image; and said detection step includes detecting the emitted radiation image to produce an electrical image signal.

7. The method of claim 1 wherein said scanning step includes scanning a beam of radiation in a line across said support and wherein said support is moved in a direction perpendicular to a line scan direction, or wherein said scanning line is moved relative to said support in a direction perpendicular to said line scan direction.

8. The method of claim 1, where the scanning step includes illuminating the toner image with a linear fan beam of radiation and where the optical response thus produced is detected with a linear array of photodetectors.

9. The method of claim 1, where the, scanning step includes illuminating the toner image with an area beam of radiation and where the optical response thus produced is detected with an area array of photodetectors.

10. The method of claim 1, including the step of cleaning said toner image from said support after said detecting step.

11. The method of claim 1 wherein said liquid layer in contact with said toner image comprises a low vapor pressure liquid having a high flash point.

12. The method of claim 11 wherein said liquid layer in contact with said toner image comprises a liquid having a flash point higher than 140° F. and vapor pressure less than 5.2 mm of mercury at 38° C.

13. The method of claim 3, wherein said rinse liquid comprises a low vapor pressure liquid.

14. The method of claim 13, wherein said rinse liquid comprises a liquid having a flash point higher than 140° F.

15. The method of claim 2, wherein the liquid layer in contact with said liquid toner comprises a low vapor pressure liquid having a high flash point.

16. The method of claim 15, wherein said liquid layer comprises a liquid having a flash point higher than 140° F., and vapor pressure less than 5.2 mm of mercury at 38° C.

17. The method of claim 3, wherein said rinsing step includes rinsing the liquid-toned image when still wet, with a low vapor pressure liquids having a high flash point, and sending the still-wet rinsed image for said scanning through said liquid layer.

18. The method of claim 3 wherein said rinsing step includes rinsing the liquid-toned image when still wet with a low vapor pressure liquid having vapor pressure less than 5.2 mm of mercury at 38° C. and having a flash point higher than 140° F., and sending the s still-wet rinsed image for said scanning through said liquid layer.

* * * * *